United States Patent
Semenko et al.

(10) Patent No.: US 9,286,152 B2
(45) Date of Patent: Mar. 15, 2016

(54) SECURELY OBTAINING MEMORY CONTENT AFTER DEVICE MALFUNCTION

(71) Applicant: Microsoft Corporation, Redmond, WA (US)

(72) Inventors: Alex Mark Semenko, Issaquah, WA (US); Kirsten Valery Stark, Seattle, WA (US); Innokentiy Basmov, Redmond, WA (US); Kevin Chin, Bellevue, WA (US); Scott Chao-Chueh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 13/918,591

(22) Filed: Jun. 14, 2013

(65) Prior Publication Data

US 2014/0372740 A1    Dec. 18, 2014

(51) Int. Cl.
*G06F 9/00* (2006.01)
*G06F 11/07* (2006.01)
*G06F 1/24* (2006.01)

(52) U.S. Cl.
CPC .............. *G06F 11/0766* (2013.01); *G06F 1/24* (2013.01); *G06F 11/0778* (2013.01); *G06F 11/0757* (2013.01); *G06F 11/0793* (2013.01)

(58) Field of Classification Search
USPC ......................................................... 713/193
See application file for complete search history.

(56) References Cited

U.S. PATENT DOCUMENTS

| | | | |
|---|---|---|---|
| 5,557,777 A * | 9/1996 | Culbert ............................. 713/2 |
| 5,872,967 A * | 2/1999 | DeRoo et al. .................... 713/2 |
| 6,615,365 B1 | 9/2003 | Jenevein |
| 6,880,113 B2 | 4/2005 | Anderson |
| 6,941,456 B2 * | 9/2005 | Wilson ........................... 713/160 |
| 7,290,175 B1 | 10/2007 | Kessler |
| 7,734,945 B1 | 6/2010 | Levidow |
| 7,831,857 B2 | 11/2010 | Muppirala |
| 7,861,113 B2 * | 12/2010 | Wang ............................... 714/11 |
| 7,929,706 B2 * | 4/2011 | Li ................................... 380/286 |

(Continued)

OTHER PUBLICATIONS

Int. Search Report cited in PCT Application No. PCT/US2013/060758 dated Dec. 13, 2013, 11 pgs.

(Continued)

*Primary Examiner* — Amare F Tabor
(74) *Attorney, Agent, or Firm* — John Jardine; Raghu Chinagudabha; Micky Minhas

(57) ABSTRACT

One or more techniques and/or systems are provided for securely obtaining memory content after a device malfunction. For example, applications, components, and/or an operating system of a device may maintain information within volatile memory in a secure manner (e.g., using encryption). When the device malfunctions, such information may be useful for diagnosing what caused the malfunction. Accordingly, memory content within volatile memory may be securely retrieved, encrypted, and/or stored before such memory content is flushed/removed from volatile memory. For example, a warm reset is performed to initially reboot the device without removing memory content from volatile memory. The memory content may be retrieved and encrypted to create encrypted memory content that may be stored within nonvolatile memory for later access. After a second reboot, device malfunction information may be obtained by decrypting the encrypted memory content using a private key matching a public key used to encrypt the memory content.

20 Claims, 9 Drawing Sheets

(56) References Cited

U.S. PATENT DOCUMENTS

| | | |
|---|---|---|
| 8,132,057 B2 | 3/2012 | Jann |
| 8,171,309 B1 | 5/2012 | Poo |
| 8,375,386 B2 | 2/2013 | Hendel |
| 8,412,406 B2 * | 4/2013 | Johnson et al. ............. 701/33.1 |
| 8,516,271 B2 * | 8/2013 | Faraboschi et al. .......... 713/190 |
| 2005/0193195 A1 * | 9/2005 | Wu et al. ....................... 713/165 |
| 2008/0270827 A1 | 10/2008 | Brandyberry et al. |
| 2009/0024820 A1 | 1/2009 | Ponnuswamy |
| 2012/0023319 A1 * | 1/2012 | Chin et al. ........................ 713/2 |
| 2012/0102370 A1 | 4/2012 | Yoshida et al. |
| 2013/0091571 A1 * | 4/2013 | Lu .................................. 726/23 |
| 2013/0238887 A1 * | 9/2013 | Xu et al. ........................... 713/2 |
| 2013/0282951 A1 * | 10/2013 | Kuo et al. ..................... 711/102 |

OTHER PUBLICATIONS

"Cryptography", From Wikipedia, the free encyclopedia, Jun. 8, 2013, reprinted from the Internet at: http://en.wikipedia.org/wiki/Cryptography, 17 pgs.

Jann, et al., "An OS-Hypervisor Infrastructure for Automated OS Crash Diagnosis and Recovery in a Virtualized Environment"—Published Date: Oct. 24, 2012, pp. 8, Proceedings: In IEEE 24th International Symposium on Computer Architecture and High Performance Computing, http://ieeexplore.ieee.org/stamp/stamp.jsp?tp=&arnumber=6374789.

* cited by examiner

SECURELY OBTAINING MEMORY CONTENT AFTER DEVICE MALFUNCTION

BACKGROUND

Many different types of hardware platforms are used to build devices, such as mobile phones, tablets, desktop computers, etc. For example, a first tablet manufacturer may utilize a particular platform comprising a processor, memory, graphics card, and/or other components that may differ from platform components used by a second tablet manufacturer to create tablet devices. Accordingly, because different components and/or platforms exist across different instances of a same device, extensive software testing, such as operating system stability testing, may be performed to determine whether such software can stably operate across the different instances. During testing, a device may become unresponsive (e.g., a hard hang) where software debugging functionality may be unable to access and/or debug what issue(s) caused the unresponsiveness. For example, the hard hang may result from a firmware bug, a hardware failure, and/or software problem. Accordingly, the device may have to be rebooted so that the device once again becomes responsive. During such a reboot, however, volatile memory is flushed/removed, whereby helpful diagnostic information may be lost from the volatile memory.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for securely obtaining memory content after a device malfunction are provided herein. For example, during normal operation of a device (e.g., a tablet, a mobile phone, a desktop computer, etc.), the device may be responsive such that software, such as an operating system, applications, software debugging functionality, etc., may actively execute on the device. However, when the device malfunctions, the device may become non-responsive (e.g., a hard hang where software, such as software debugging functionality, is unable to access and/or execute on the device). Accordingly, a device malfunction may be identified based upon non-responsiveness of the device so that device malfunction information may be collected from memory content within volatile memory before being flushed/removed (e.g., volatile memory such as main memory of the device and/or memory of a subcomponent such as a network card, a graphics processing unit, etc.). For example, a watchdog timer may be configured to update a responsiveness value (e.g., one or more bits). When the device malfunctions, the watchdog timer may not operate to update the responsiveness value, which may be detected as non-responsiveness of the device where the responsiveness value is not updated within a timeout threshold.

Responsive to detecting non-responsiveness of the device, a warm reset of the device may be performed to initially reboot the device. As opposed to flushing/removing memory content from volatile memory during a standard reboot, the warm reset may retain the memory content within the volatile memory after the device is initially rebooted. For example, a memory controller for the volatile memory may not be reset such that the volatile memory retains a self-refresh state during the warm reset so that the memory content is not flushed/removed from the volatile memory (e.g., as opposed to a standard reboot whereby the memory controller may be reset so that the volatile memory transitions to a non-self-refresh state such that the memory content would be flushed/removed).

Responsive to the device being initially rebooted from the warm reset (e.g., initially rebooted where firmware of the device may be in control of the device and/or where the memory content is still comprised within the volatile memory), the memory content may be retrieved and encrypted to create encrypted memory content. In an example, a public key (e.g., maintained by the firmware, and corresponding to a private key maintained in secret by a diagnostic component), may be used to encrypt the memory content to create the encrypted memory content. In another example, a symmetric key may be used to encrypt the memory content to create the encrypted memory content. The public key may be used to encrypt the symmetric key to create an encrypted symmetric key. The encrypted symmetric key and/or the encrypted memory content may be used to create an encrypted blob. The encrypted memory content and/or the encrypted blob may be stored (e.g., within a non-volatile storage location or within volatile memory) for access after a second reboot (e.g., for use in diagnosing why the device malfunctioned).

In an example, a second reboot of the device may be performed. For example, the second reboot may reset the memory controller so that the volatile memory transitions from the self-refresh state to the non-self-refresh state (e.g., thus flushing/removing the memory content from the volatile memory during the second reboot for security purposes). The encrypted memory content and/or the encrypted blob may be decrypted to obtain access to the memory content. For example, the operating system may utilize the private key to decrypt the encrypted memory content and/or the encrypted blob. In this way, device malfunction information may be obtained from the memory content. For example, the device malfunction information may be used for telemetry and/or debugging purposes. In another example, the memory content may be accessible without a second reboot. For example, memory content may be accessed from volatile memory, encrypted, and persisted (e.g., persisted to a location accessible to an operating system or a diagnostic component). A memory overwrite request (MOR) operation (e.g., performed by firmware of the device) may clear the content of the volatile memory after the encrypted memory content is persisted. Once the volatile memory is cleared, a first boot sequence may proceed, and the memory content may be accessible at the persisted location after the first boot sequence.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
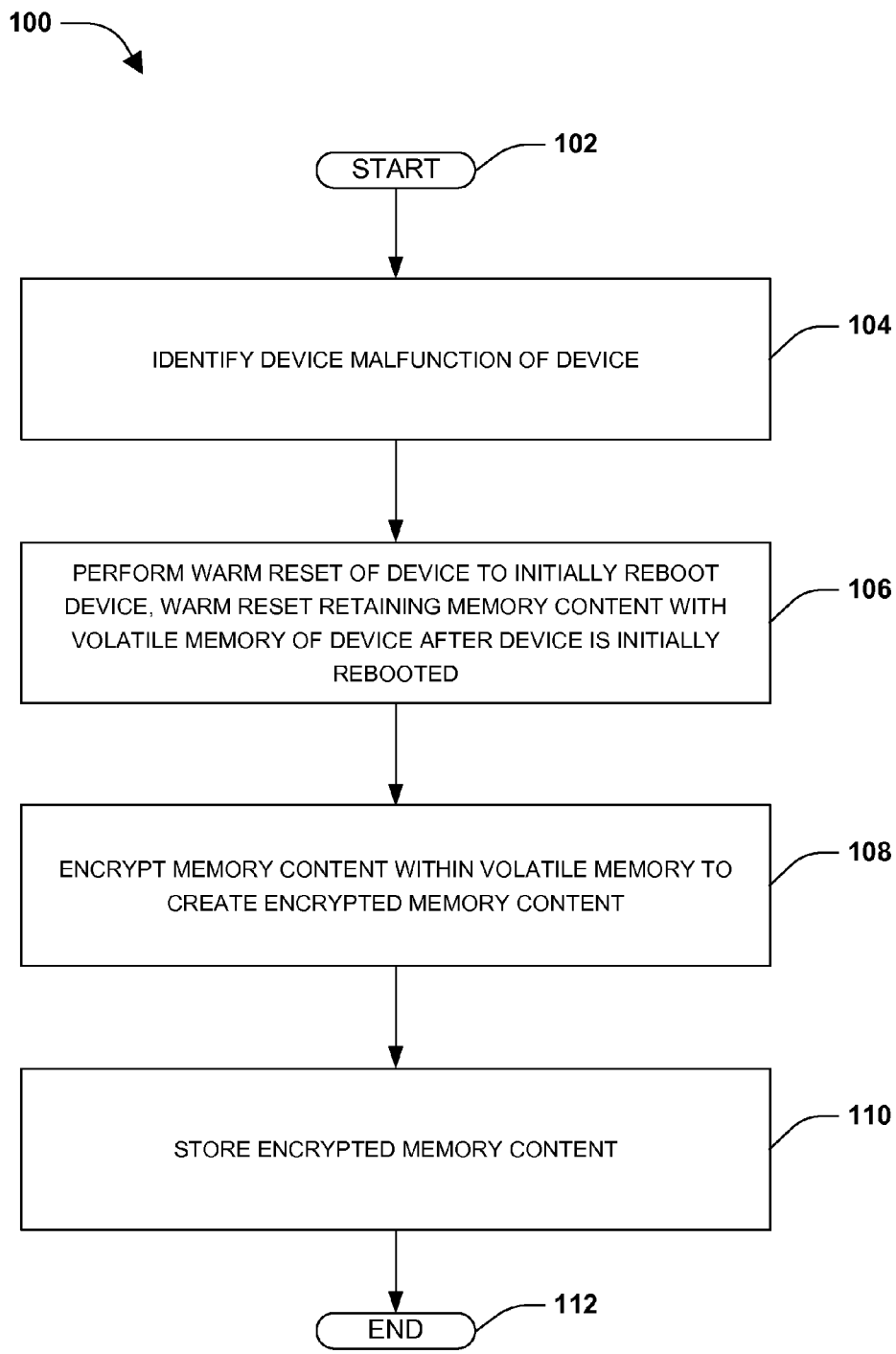
FIG. 1 is a flow diagram illustrating an exemplary method of securely obtaining memory content after a device malfunction.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of securely obtaining memory content after a device malfunction is illustrated by an exemplary method 100 of FIG. 1. At 102, the method starts. At 104, a device malfunction, such as on a mobile phone, a tablet, or other computing device, may be identified based upon non-responsiveness of the device. In an example, a watchdog timer may be configured to update a responsiveness value (e.g., one or more bits) that may indicate whether the device is responsive or non-responsive (e.g., operating in a non-desired manner such as not executing applications, not executing an operating system, not executing software debugging functionality, etc.). If the device malfunctions, then the watchdog timer may not update the responsiveness value. If the responsiveness value is not updated within a timeout threshold (e.g., times out before being updated), then the device malfunction may be identified for the device (e.g., FIG. 2).

Figure 3:
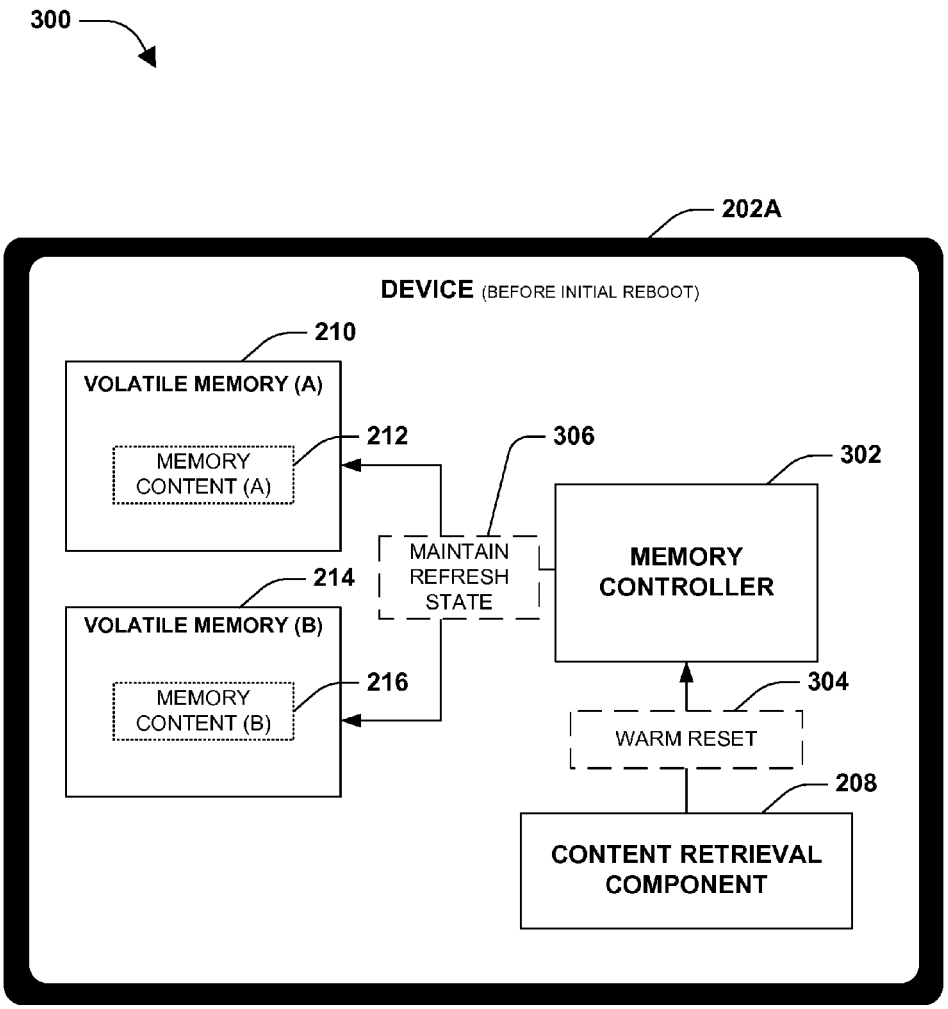
FIG. 3 is a component block diagram illustrating an exemplary system for performing a warm reset responsive to a device malfunction.

At 106, a warm reset of the device may be performed to initially reboot the device (e.g., FIG. 3). Memory content within volatile memory of the device may be retained after the device is initially rebooted because the warm reset, as opposed to a standard reboot that may flush/remove the memory content from the volatile memory, was performed (e.g., FIGS. 4A and 4B). In an example of the warm reset, a memory controller for the volatile memory may not be reset such that the volatile memory retains a self-refresh state during the warm reset, and thus retains the memory content (e.g., power is provided to the volatile memory to periodically or continually refresh the volatile memory so that content therein is not lost). In an example, the volatile memory may comprise one or more volatile memory devices, such as a main memory of the device and/or volatile memory of a subcomponent of the device (e.g., a modem, a network card, a graphics, card, a sound card, etc.).

At 108, responsive to the device being initially rebooted from the warm reset (e.g., into a state where firmware of the device has control over the device), the memory content within the volatile memory may be retrieved and encrypted to create encrypted memory content. In an example, a public key may be utilized to encrypt the memory content to create the encrypted memory content (e.g., the firmware may utilize the public key corresponding to a private key maintained by an operating system in secret such that the operating system may decrypt the encrypted memory content) (e.g., FIG. 4A). In another example, a symmetric key may be used to encrypt the memory content to create the encrypted memory content, and the public key may be utilized to encrypt the symmetric key to create an encrypted symmetric key. The encrypted symmetric key and/or the encrypted memory content may be used to create an encrypted blob (e.g., FIG. 4B).

At 110, the encrypted memory content (e.g., and/or the encrypted blob) may be stored for access (e.g., after a second reboot). For example, the encrypted memory content may be stored within non-volatile memory, a storage device, one or more physical memory pages maintained by the operating system for diagnostic purposes, etc. The second reboot may be performed to reboot the device where memory content within the volatile memory is flushed/removed for security and/or operational purposes. For example, the memory controller may be reset to transition the volatile memory from the self-refresh state to a non-self-refresh state for the second reboot (e.g., such that power is not applied to the volatile memory and thus content therein is lost). The encrypted memory content may be decrypted to obtain access to the memory content. In an example, the private key may be used to decrypt the encrypted memory content (e.g., the operating system may utilize the private key to perform the decryption). In another example, the private key may be used to decrypt the encrypted blob, and the symmetric key may be used to decrypt the encrypted memory content. In this way, device malfunction information maybe obtained from the memory content. In another example, the memory content may be accessible without a second reboot. For example, memory content may be accessed from volatile memory, encrypted, and persisted (e.g., persisted to a location accessible to an operating system or a diagnostic component). A memory overwrite request (MOR) operation (e.g., performed by firmware of the device) may clear the content of the volatile memory after the encrypted memory content is persisted. Once the volatile memory is cleared, a first boot sequence may proceed, and the memory content may be accessible at the persisted location.

Figure 2:
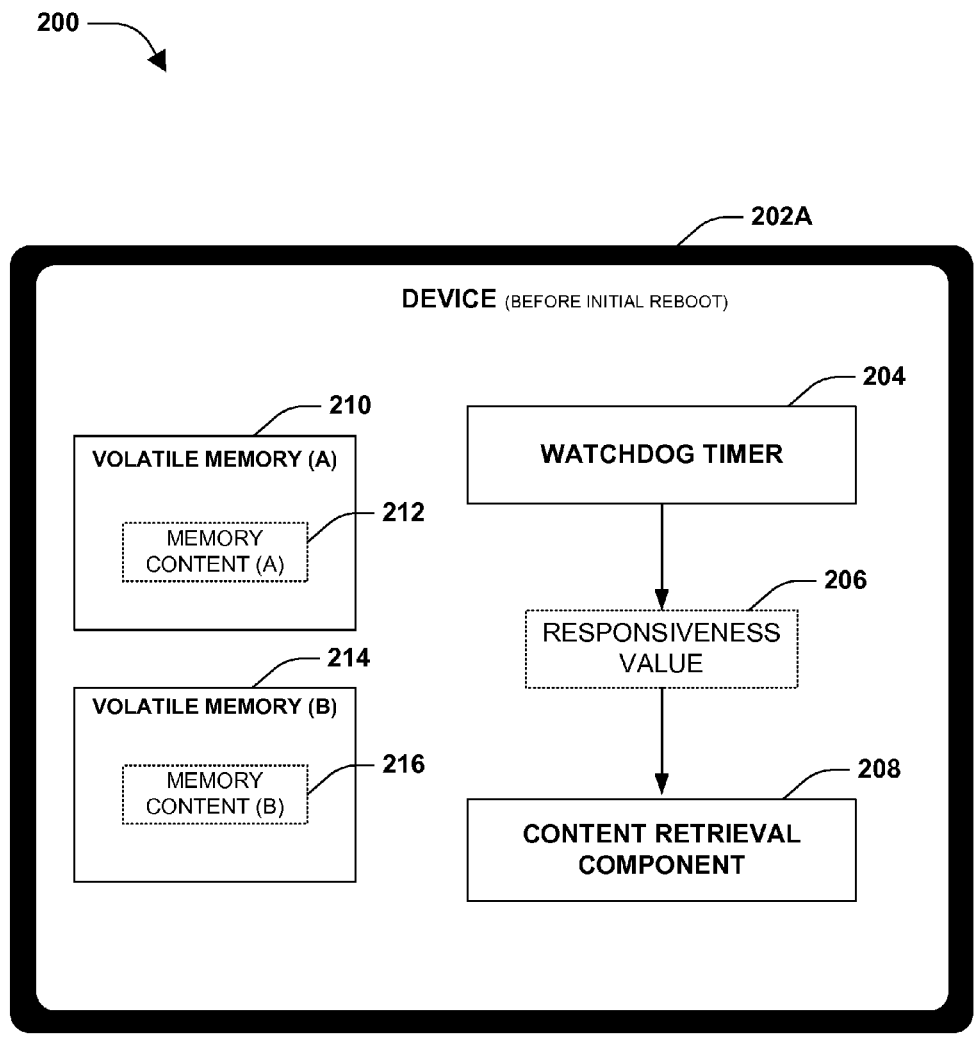
FIG. 2 is a component block diagram illustrating an exemplary system for detecting a device malfunction before an initial reboot.

FIG. 2 illustrates an example of a system 200 for detecting a device malfunction associated with a device 202A before an initial reboot. The system 200 may comprise a content retrieval component 208 associated with the device 202A. The content retrieval component 208 may be hosted within the device 202A (e.g., the content retrieval component 208 may be implemented through firmware of the device) or may be implemented within a second device (e.g., an administrator device having network access to the device 202A). The device 202A (e.g., a tablet device, a mobile device, and/or any other computing device) may comprise volatile memory, such as volatile memory (A) 210 (e.g., main memory utilized by the device 202A to store information, such as memory content (A) 212, used by applications and/or an operating system), volatile memory (B) 214 (e.g., memory of a subcomponent such as a graphics card used to store graphical information such as memory content (B) 216), and/or other volatile memory not illustrated. It may be appreciated that FIGS. 2-5B illustrate two volatile memories merely for illustrative purposes, and that a device may comprise any number of volatile memories. In this way, the volatile memory (A) 210 may comprise the memory content (A) 212 and the volatile memory (B) 214 may comprise the memory content (B) 216 before an initial reboot of the device, as illustrated by device 202A.

A device malfunction associated with the device 202A may be identified utilizing a watchdog timer 204. The watchdog timer 204 may be configured to update a responsiveness value 206 (e.g., during responsive operation or non-malfunctioning of the device 202A, such as where the device 202A is functioning in a state where a clock interrupt may continue to operate). If the device 202A malfunctions, then the watchdog timer 204 may not operate, and thus the responsiveness value 206 may not be updated by the watchdog timer 204. The content retrieval component 208 may be configured to identify the device malfunction associated with the device 202A based upon the responsiveness value 206 not being updated within a timeout threshold. Accordingly, the content retrieval component 208 may perform a warm reset of the device (e.g., FIG. 3) in order to securely retrieve memory content from volatile memory for diagnostic purposes (e.g., FIGS. 4A-5B).

Figure 4A:
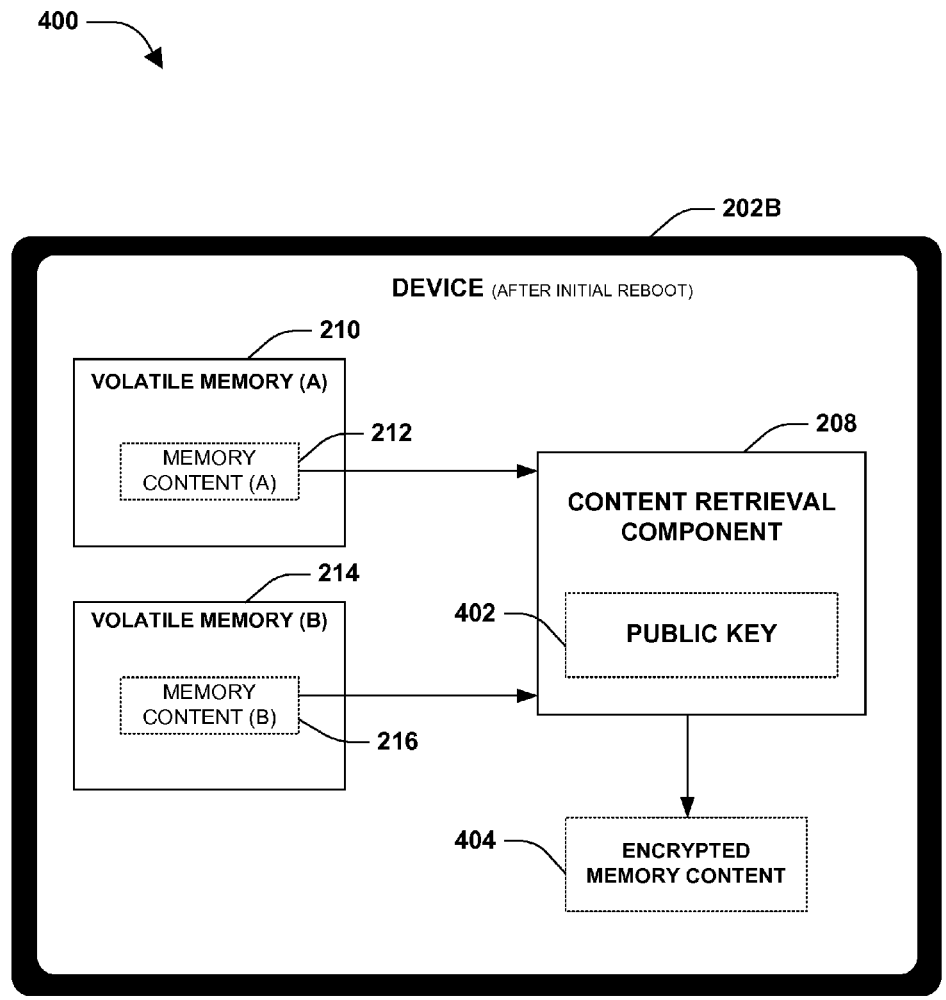
FIG. 4A is a component block diagram illustrating an exemplary system for encrypting memory content of volatile memory within a device after an initial reboot to create encrypted memory content.
Figure 4B:
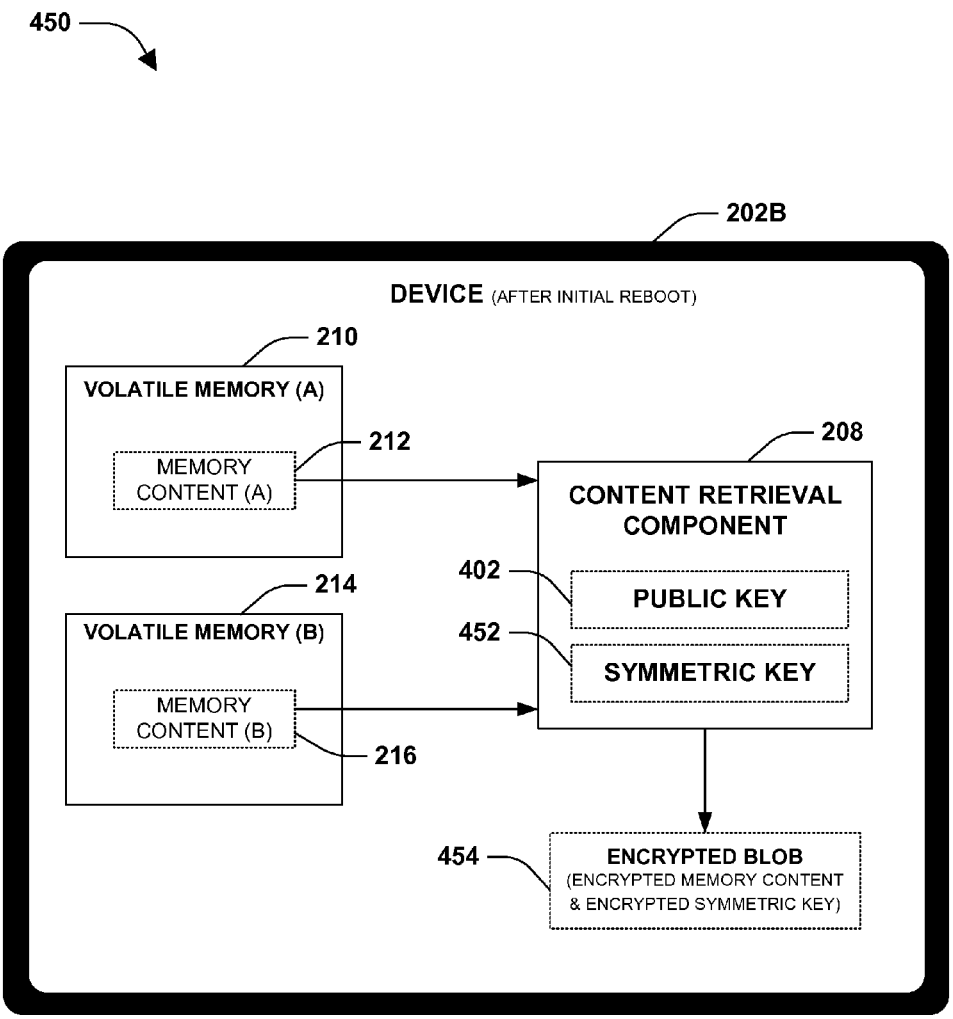
FIG. 4B is a component block diagram illustrating an exemplary system for encrypting memory content of volatile memory within a device after an initial reboot to create an encrypted blob.

FIG. 3 illustrates an example of a system 300 configured for performing a warm reset 304 responsive to a device malfunction associated with a device 202A. The system 300 may comprise a content retrieval component 208. In an example, the content retrieval component 208 may have detected the device malfunction associated with the device 202A (e.g., FIG. 2). The content retrieval component 208 may be configured to perform the warm reset 304 to initially reboot the device 202A while retaining memory content within volatile memory of the device 202A, such as memory content (A) 212 within volatile memory (A) 210 and/or memory content (B) 216 within volatile memory 214 (e.g., resulting in device 202B after initial reboot, as illustrated in FIGS. 4A and 4B). For example, the content retrieval component 208 may instruct a memory controller 302 to refrain from resetting so that the volatile memory (A) 210 and/or the volatile memory (B) 214 remain in a self-refresh state 306 during the warm reset 304, and thus retaining the memory content (A) 212 and/or the memory content (B) 216.

Figure 5A:
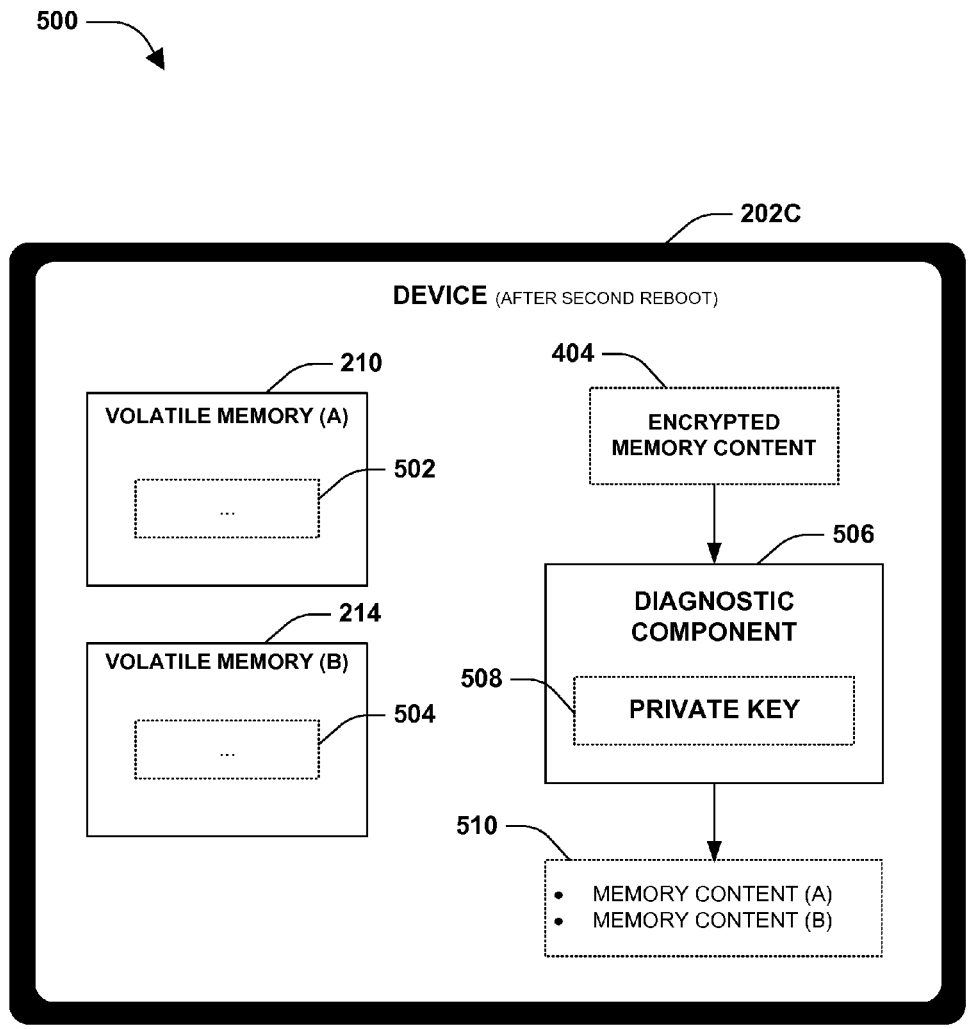
FIG. 5A is a component block diagram illustrating an exemplary system for obtaining device malfunction information from encrypted memory content.

FIG. 4A illustrates an example of a system 400 configured for encrypting memory content of volatile memory within a device 202B after an initial reboot to create encrypted memory content 404. The system 400 may comprise a content retrieval component 208. In an example, the content retrieval component 208 may have performed a warm reset 304 of device 202A to initially reboot device 202A (e.g., FIG. 3), resulting in device 202B after initial reboot. The content retrieval component 208 may maintain a public key 402 corresponding to a private key (e.g., private key 508 maintained by a diagnostic component 506, as illustrated in FIG. 5A) that may be used to decrypt the encrypted memory content 404. In this way, the content retrieval component 208 may use the public key 402 to encrypt memory content (A) 212 of volatile memory 210 and/or memory content (B) 214 of volatile memory 214 to create the encrypted memory content 404 so that malicious software (e.g., a malicious operating system used by a hacker to access information within the device 202B) may be restricted from accessing the memory content (A) 212 and/or the memory content (B) 214 which may have been securely stored within the volatile memory (A) 210 and/or the volatile memory (B) 214 (e.g., an operating system may have utilized an encryption technique, such as a full volume encryption technique, to securely store information within the device 202B during operation of the device 202B, and thus such information is to remain secure even after the content retrieval component 208 has removed the information from volatile memory). Thus, a component, such as the diagnostic component 506 or an operating system component, comprising the private key 508 may access the memory content within the encrypted memory content 404, such as after a second reboot (e.g., FIG. 5A).

Figure 5B:
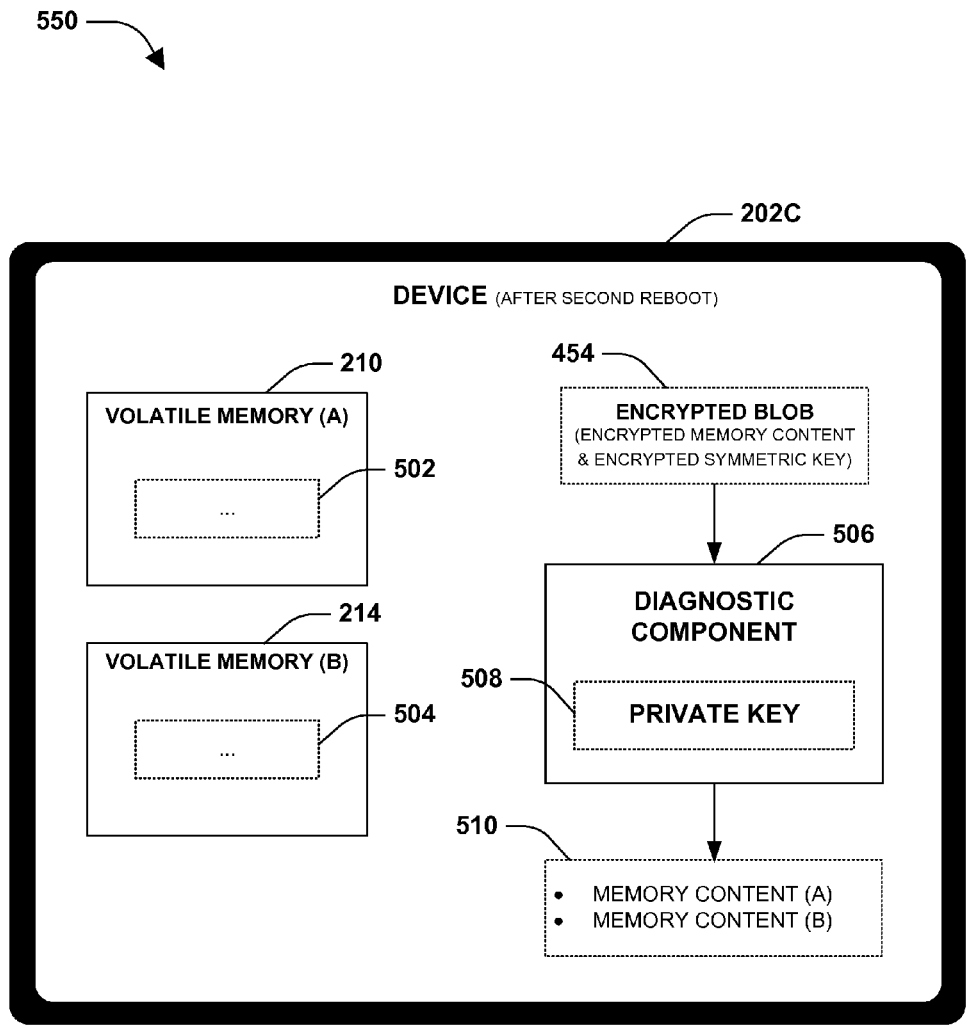
FIG. 5B is a component block diagram illustrating an exemplary system for obtaining device malfunction information from an encrypted blob.

FIG. 4B illustrates an example of a system 450 configured for encrypting memory content of volatile memory within a device 202B after an initial reboot to create an encrypted blob 454. The system 450 may comprise a content retrieval component 208. In an example, the content retrieval component 208 may have performed a warm reset 304 of device 202A to initially reboot device 202A (e.g., FIG. 3), resulting in device 202B after initial reboot. The content retrieval component 208 may maintain a public key 402 corresponding to a private key (e.g., private key 508 maintained by a diagnostic component 506, as illustrated in FIG. 5B) that may be used to decrypt the encrypted blob 454. The content retrieval component 208 may utilize a symmetric key 452 to encrypt memory content (A) 212 of volatile memory (A) 210 and/or memory content (B) 216 of volatile memory (B) 214 to create encrypted memory content. The content retrieval component 208 may utilize the public key 402 to encrypt the symmetric key 452 to create an encrypted symmetric key. The encrypted symmetric key and/or the encrypted memory content may be utilized to create the encrypted blob 454. Thus, a component, such as the diagnostic component 506 or an operating system component, comprising the private key 508 may access the memory content by decrypting the encrypted blob 454 utilizing the private key 508 and decrypting the encrypted memory content using the symmetric key 452, such as after a second reboot (e.g., FIG. 5B).

FIG. 5A illustrates an example of a system 500 configured for obtaining device malfunction information from encrypted memory content 404. The system 500 may comprise a diagnostic component 506 (e.g., implemented by at least one of an operating system or firmware) associated with a device 202C after a second reboot. The diagnostic component 506 may be hosted within the device 202C (e.g., as an operating system component) or may be implemented within a second device (e.g., an administrator device having network access to the device 202C). The device 202C may corresponding to a device 202B of FIG. 4A after the second reboot (e.g., a reboot of device 202B of FIG. 4A after memory content was retrieved from volatile memory and encrypted to create the encrypted memory content 404, such as before a MOR bit was set to true for flushing/removing memory content from volatile memory). In an example, the second reboot may have flushed/removed memory content from the volatile memory (A) 210 (e.g., removal 502) and/or from volatile memory (B) 214 (e.g., removal 504) for security and/or operational reasons. The diagnostic component 506 may maintain a private key 508 corresponding to a public key (e.g., public key 402 of FIG. 4A) used to create the encrypted memory content 404 so that malicious entities without the private key 508 may be unable to access memory content (e.g., from within the encrypted memory content 404) that was previously stored within the volatile memory (A) 210 and/or the volatile memory (B) 214 in a secure manner, such as by an operating system using a full volume encryption technique and/or other encryption techniques. In this way, the diagnostic component 506 may decrypt the encrypted memory content 404 using the private key 508 to access memory content 510 such as memory content (A) and/or memory content (B) previously stored within the volatile memory (A) 210 and/or the volatile memory (B) 214. The diagnostic component 506 may obtain device malfunction information from the memory content 510. In an example, the diagnostic component 506 may format the memory content 510 into a debuggable format. In another example, the diagnostic component 506 may use the memory content 510 for telemetry.

FIG. 5B illustrates an example of a system 550 configured for obtaining device malfunction information from an encrypted blob 454. The system 500 may comprise a diagnostic component 506 (e.g., implemented by at least one of an operating system or firmware) associated with a device 202C after a second reboot. The device 202C may correspond to device 202B of FIG. 4B after the second reboot (e.g., a reboot of device 202B of FIG. 4B after memory content was retrieved from volatile memory and encrypted to create the encrypted blob 454, such as before a MOR bit was set to true for flushing/removing memory content from volatile memory). In an example, the second reboot may have flushed/removed memory content from the volatile memory (A) 210 (e.g., removal 502) and/or from volatile memory (B) 214 (e.g., removal 504). The diagnostic component 506 may maintain a private key 508 corresponding to a public key (e.g., public key 402 of FIG. 4B) used to create the encrypted blob 454 so that malicious entities without the private key 508 may be unable to access memory content (e.g., from within the encrypted blob 454) that was previously stored within the volatile memory (A) 210 and/or the volatile memory (B) 214 in a secure manner, such as by an operating system using a full volume encryption technique and/or other encryption techniques. In this way, the diagnostic component 506 may decrypt the encrypted symmetric key within the encrypted blob 454 to obtain access to a symmetric key that was used to create the encrypted memory content. The diagnostic component 506 may use the symmetric key to decrypt the encrypted memory content to access to memory content 510 such as memory content (A) and/or memory content (B) previously stored within the volatile memory (A) 210 and/or the volatile memory (B) 214. The diagnostic component 506 may obtain device malfunction information from the memory content 510. In an example, the diagnostic component 506 may format the memory content 510 into a debuggable format. In another example, the diagnostic component 506 may use the memory content 510 for telemetry.

Figure 6:
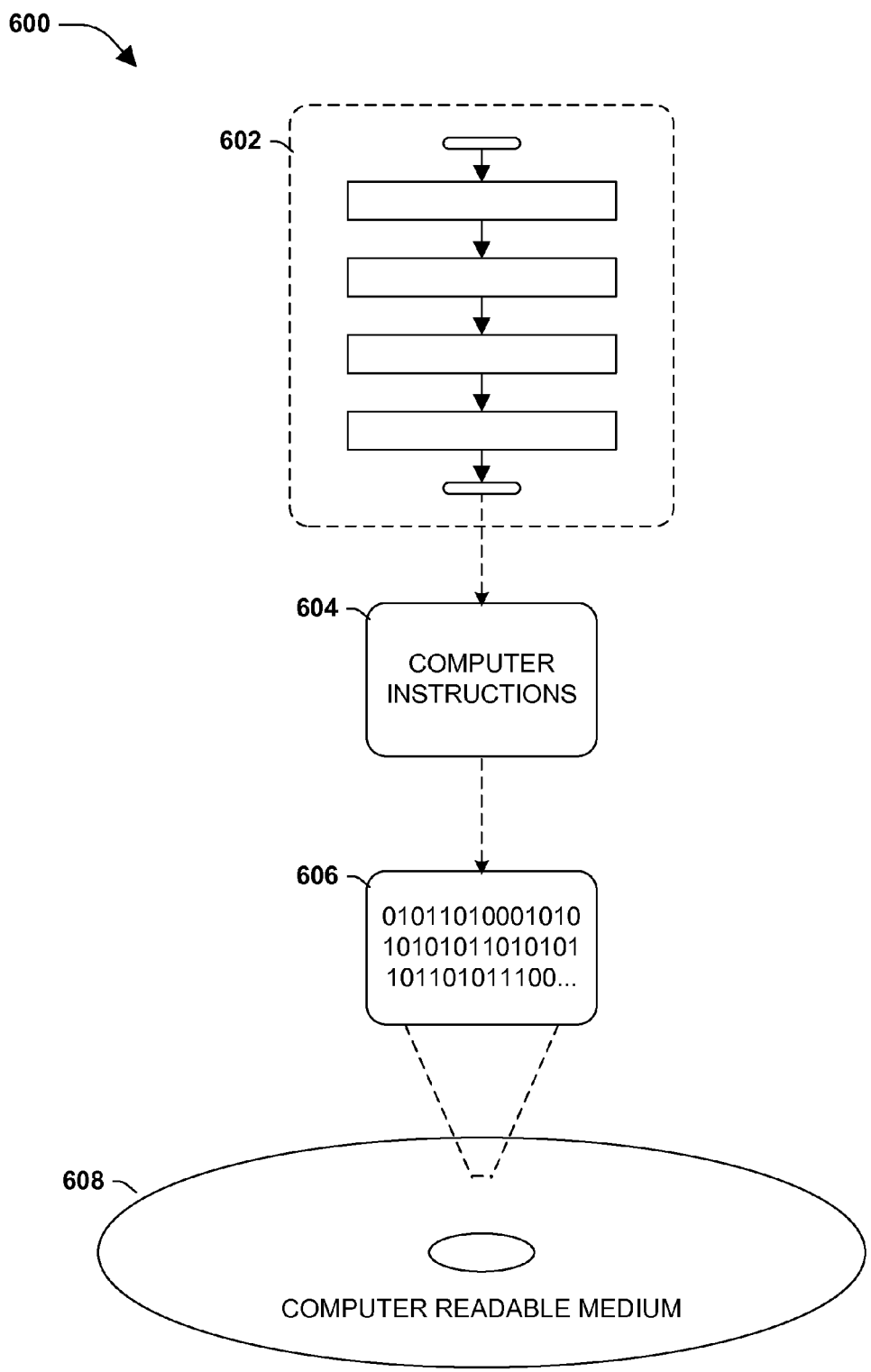
FIG. 6 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 100 of FIG. 1, for example. In some embodiments, the processor-executable instructions 604 are configured to implement a system, such as at least some of the exemplary system 200 of FIG. 2, at least some of the exemplary system 300 of FIG. 3, at least some of the exemplary system 400 of FIG. 4A, at least some of the exemplary system 450 of FIG. 4B, at least some of the exemplary system 500 of FIG. 5A, and/or least some of the exemplary system 550 of FIG. 5B, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
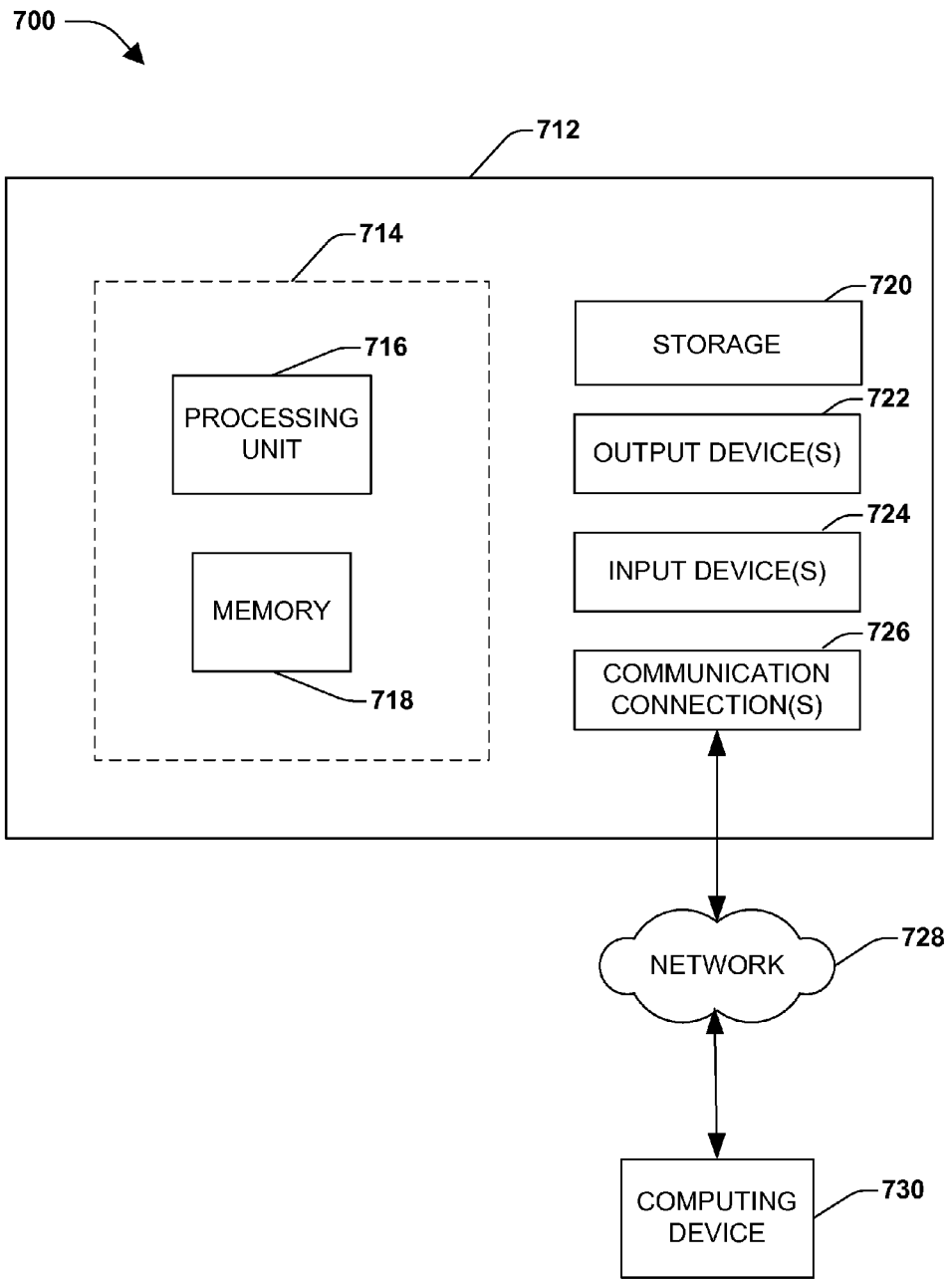
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method for securely obtaining memory content after a device malfunction, comprising:
   identifying a device malfunction based upon non-responsiveness of a device;
   performing a warm reset of the device to initially reboot the device responsive to the identifying, where power is provided to volatile memory of the device during the warm reset to retain memory content within the volatile memory; and
   responsive to the device being initially rebooted from the warm reset:
      encrypting the memory content to create encrypted memory content, the encrypted memory content being distinguished from the memory content this is retained within the volatile memory after the warm reset;
      storing the encrypted memory content separately from the memory content that is retained within the volatile memory after the warm reset, with the memory content being located within the volatile memory and simultaneously with the encrypted memory content being stored within non-volatile storage; and
      performing a second reboot to reboot the device and a flush of the memory content from the volatile memory, such that the encrypted memory content remains without retaining the memory content in the volatile memory.

2. The method of claim 1, the identifying a device malfunction comprising:
   determining whether a watchdog timer updated a responsiveness value within a timeout threshold.

3. The method of claim 1, the performing a warm reset comprising:
   refraining from resetting a memory controller for the volatile memory such that the volatile memory retains a self-refresh state during the warm reset.

4. The method of claim 1, comprising:
   decrypting the encrypted memory content after the performing a second reboot to obtain access to the memory content; and
   obtaining device malfunction information from the memory content.

5. The method of claim 1, the performing a second reboot comprising:
   resetting a memory controller to transition the volatile memory from a self-refresh state to a non-self-refresh state.

6. The method of claim 1, the encrypting memory content comprising:
   utilizing, by firmware of the device, a public key corresponding to a private key maintained by an operating system of the device to encrypt the memory content.

7. The method of claim 6, comprising:
   decrypting, by the operating system, the encrypted memory content using the private key to obtain access to the memory content; and
   obtaining device malfunction information from the memory content.

8. The method of claim 1, the encrypting memory content comprising:
   encrypting the memory content utilizing a symmetric key to create the encrypted memory content;
   utilizing a public key, corresponding to a private key maintained by an operating system of the device, to encrypt the symmetric key to create an encrypted symmetric key; and
   creating an encrypted blob based upon the encrypted memory content and the encrypted symmetric key.

9. The method of claim 8, comprising:
   decrypting, by the operating system, the encrypted symmetric key within the encrypted blob using the private key to obtain access to the symmetric key;
   decrypting the encrypted memory content using the symmetric key to obtain access to the memory content; and
   obtaining device malfunction information from the memory content.

10. The method of claim 1, comprising:
   responsive to at least one of the performing a second reboot or a memory overwrite request (MOR) operation:
      decrypting the encrypted memory content to obtain access to the memory content; and
      obtaining device malfunction information from the memory content.

11. The method of claim 1, the volatile memory comprising a first volatile memory device associated with memory of the device and a second volatile memory device associated with a subcomponent of the device.

12. A system for securely obtaining memory content after a device malfunction, comprising:
   a content retrieval component configured to:
      identify a device malfunction based upon non-responsiveness of a device;
      perform a warm reset of the device to initially reboot the device responsive to identifying the device malfunction, the warm reset retaining memory content within volatile memory of the device; and
      responsive to the device being initially rebooted from the warm reset:
         encrypt the memory content to create encrypted memory content, the encrypted memory content being distinguished from the memory content that is retained within the volatile memory after the warm reset;
         store the encrypted memory content separately from the memory content that is retained within the volatile memory after the warm reset; and
         perform a second reboot to reboot the device and flush the memory content from the volatile memory, such that the encrypted memory content remains even though the memory content in the volatile memory is flushed.

13. The system of claim 12, wherein the encrypted memory content is stored within non volatile storage comprising:
   at least one of a storage device, non-volatile memory, or one or more physical memory pages maintained by an operating system of the device for diagnostic purposes.

14. The system of claim 12, the content retrieval component implemented by firmware of the device.

15. The system of claim 12, the content retrieval component implemented on a second device remote from the device.

16. The system of claim 12, comprising:
   a diagnostic component configured to:
      decrypt the encrypted memory content after the second reboot to obtain access to the memory content; and
      obtain device malfunction information from the memory content.

17. The system of claim 16, at least one of:
   the diagnostic component implemented by at least one of an operating system of the device or firmware of the device, or
   the diagnostic component configured to decrypt the encrypted memory content and obtain device malfunction information responsive to at least one of the second reboot of the device or a memory overwrite request (MOR) operation.

18. The system of claim 12, the content retrieval component configured to:

encrypt the memory content utilizing a symmetric key to create the encrypted memory content;

utilize a public key to encrypt the symmetric key to create an encrypted symmetric key; and create an encrypted blob based upon the encrypted memory content and the encrypted symmetric key.

19. The system of claim 18, comprising:

a diagnostic component configured to:

decrypt the encrypted symmetric key within the encrypted blob using a private key, corresponding to the public key, to obtain access to the symmetric key;

decrypt the encrypted memory content using the symmetric key to obtain access to the memory content; and obtain device malfunction information from the memory content.

20. A computer readable storage device comprising instructions that when executed perform a method for securely obtaining memory content after a device malfunction, the method comprising:

identifying a device malfunction based upon non-responsiveness of a device;

performing a warm reset of the device to initially reboot the device responsive to the identifying, where power is provided to volatile memory of the device during the warm reset to retain memory content within the volatile memory;

responsive to the device being initially rebooted from the warm reset:

encrypting the memory content to create encrypted memory content, the encrypted memory content being distinguished from the memory content that is retained within the volatile memory after the warm reset; and storing the encrypted memory content separately from the memory content that is retained within the volatile memory after the warm reset and such that the memory content is stored simultaneously with the encrypted memory content.

* * * * *